No. 893,534. PATENTED JULY 14, 1908.
J. F. McELROY.
ELECTRIC LIGHTING SYSTEM.
APPLICATION FILED NOV. 15, 1904.

4 SHEETS—SHEET 1.

Witnesses
L. T. Shaw
M. A. Moder

James F. McElroy Inventor
by Bentley Warren Att'ys

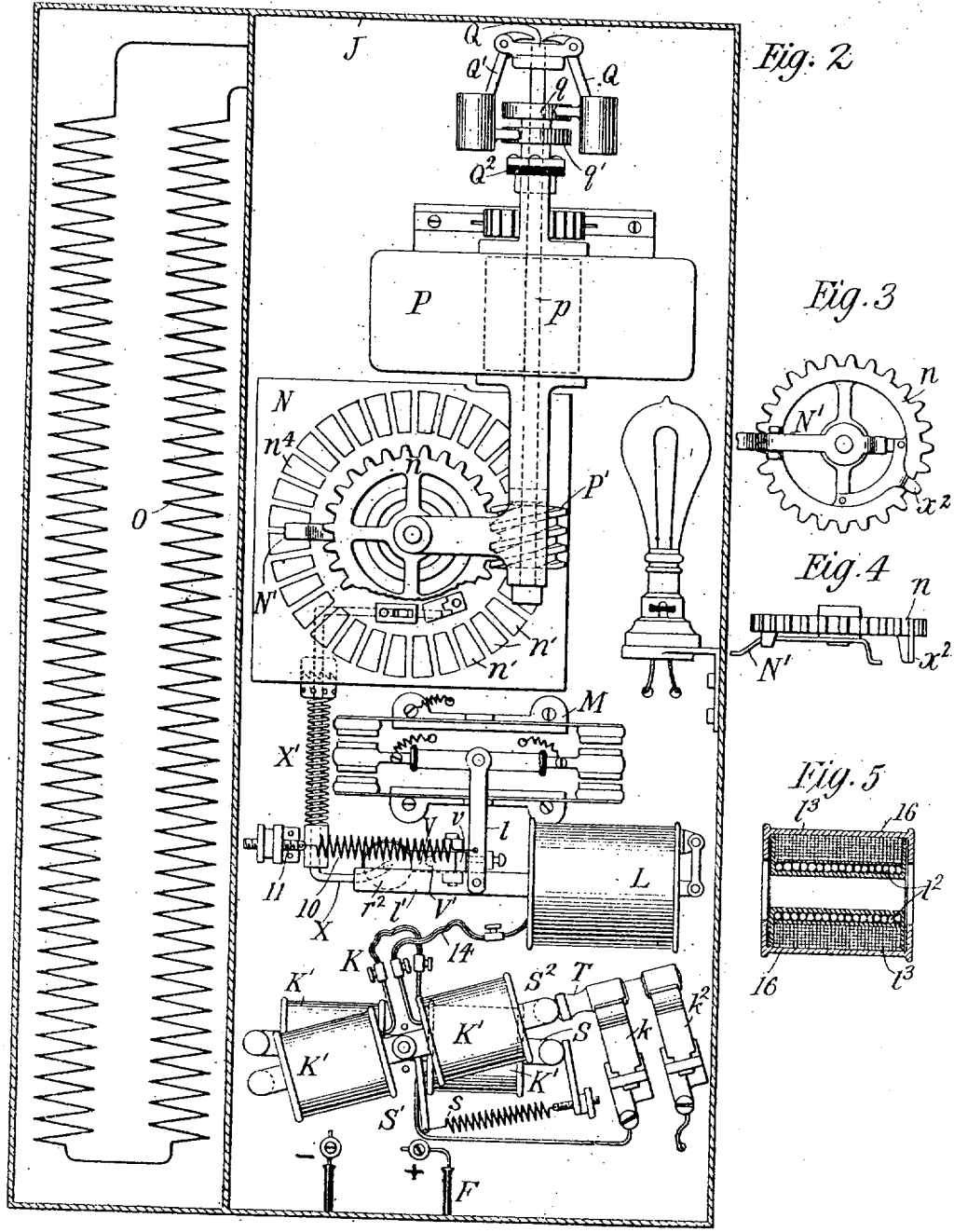

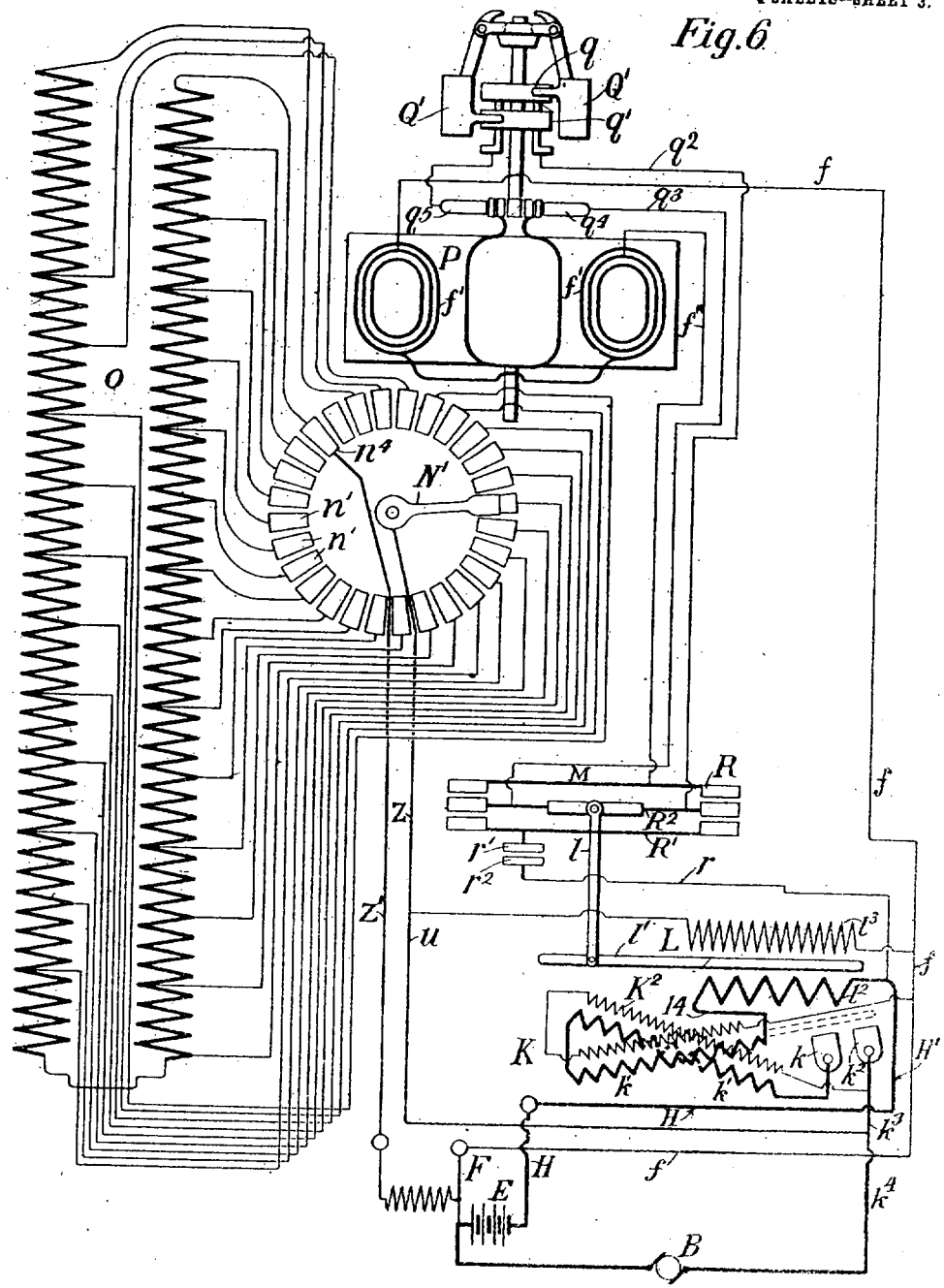

No. 893,534.  
PATENTED JULY 14, 1908.  
J. F. McELROY.  
ELECTRIC LIGHTING SYSTEM.  
APPLICATION FILED NOV. 15, 1904.

4 SHEETS—SHEET 4.

Witnesses
L. T. Shaw
M. A. Moder

James F. McElroy Inventor
by Bentley Pierson Att'ys

UNITED STATES PATENT OFFICE.

JAMES F. McELROY, OF ALBANY, NEW YORK, ASSIGNOR TO CONSOLIDATED CAR HEATING COMPANY, A CORPORATION OF WEST VIRGINIA.

ELECTRIC-LIGHTING SYSTEM.

No. 893,534.　　　　　Specification of Letters Patent.　　Patented July 14, 1908.

Original application filed July 28, 1899, Serial No. 725,433. Divided and this application filed November 15, 1904. Serial No. 232,774.

*To all whom it may concern:*

Be it known that I, JAMES F. McELROY, a citizen of the United States, residing at Albany, county of Albany, State of New York, have invented certain new and useful Improvements in Electric-Lighting Systems, of which the following specification and accompanying drawings illustrate one form of the invention which I now regard as the best out of the various forms in which the invention may be embodied.

My invention, which is a portion of that shown in my application No. 725,433, filed July 28, 1899, relates to the charging of a storage battery from a dynamo running at an intermittent and variable speed and regulated for a substantially constant voltage.

It is particularly suitable for a dynamo driven by an axle of a railway vehicle, which charges a battery on the vehicle, the battery, when charged, serving in any desired manner to supply current for electric lamps or other current-consuming devices. In such a situation it is needful to disconnect the battery from the dynamo whenever the speed of the latter falls so low that it cannot generate a potential equaling at least that of the counter potential of the battery, and also to again connect the battery to the dynamo when the speed and potential rise once more to the normal value. Hence there must be a repeated and automatic connection of battery to dynamo, which may occur at times when the battery is wholly or partly exhausted, in which event the normal voltage of the charging dynamo may send into the battery an excessive amount of current tending to injure it, or decrease the economy of the operation.

It is the object of my invention to so adjust, in accordance with the condition of the battery, the standard of voltage which the regulator tends to maintain, in order that such excessive current will not occur.

I now proceed to describe my invention, reference being had to the accompanying drawings.

Figure 1:
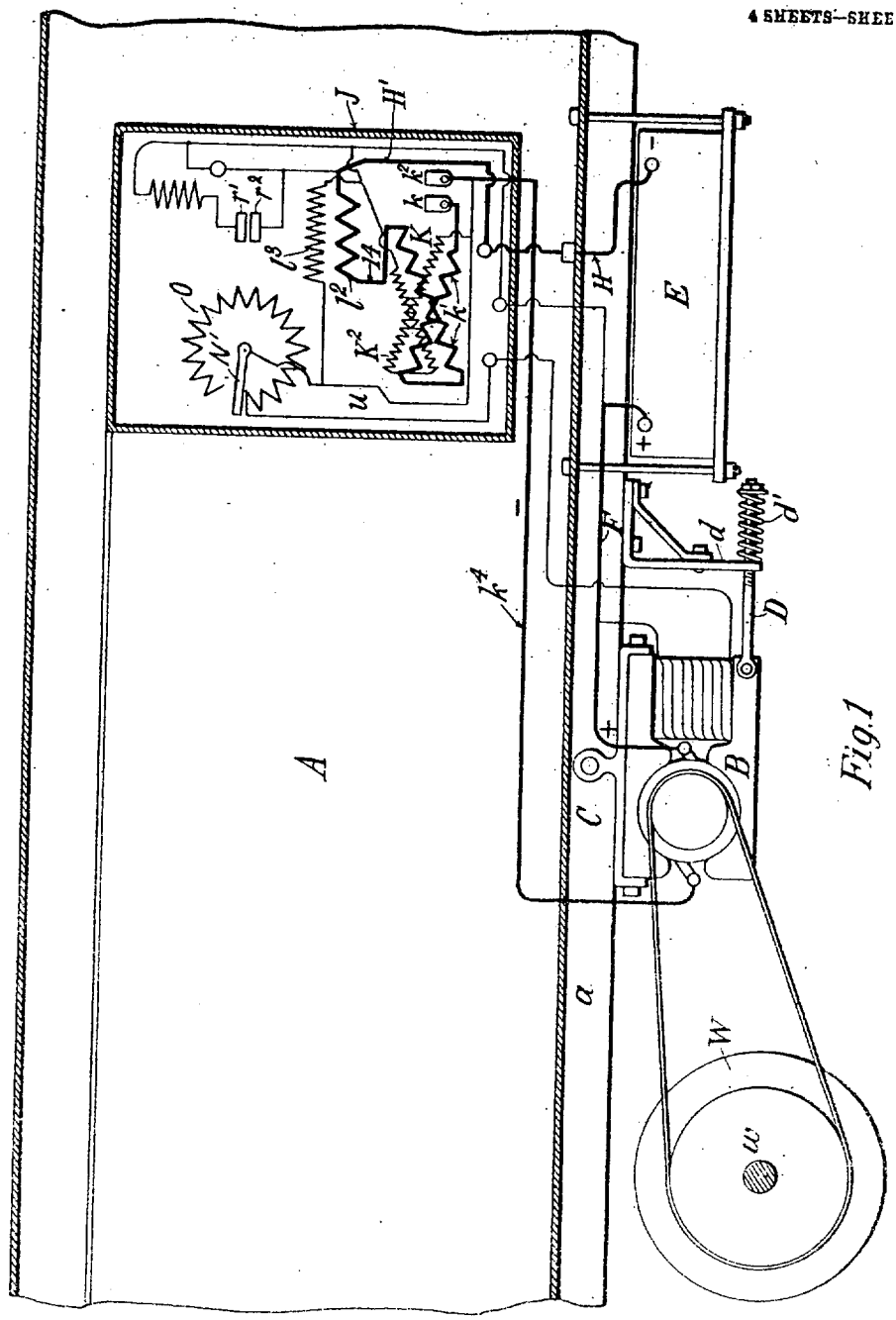
Figure 7:
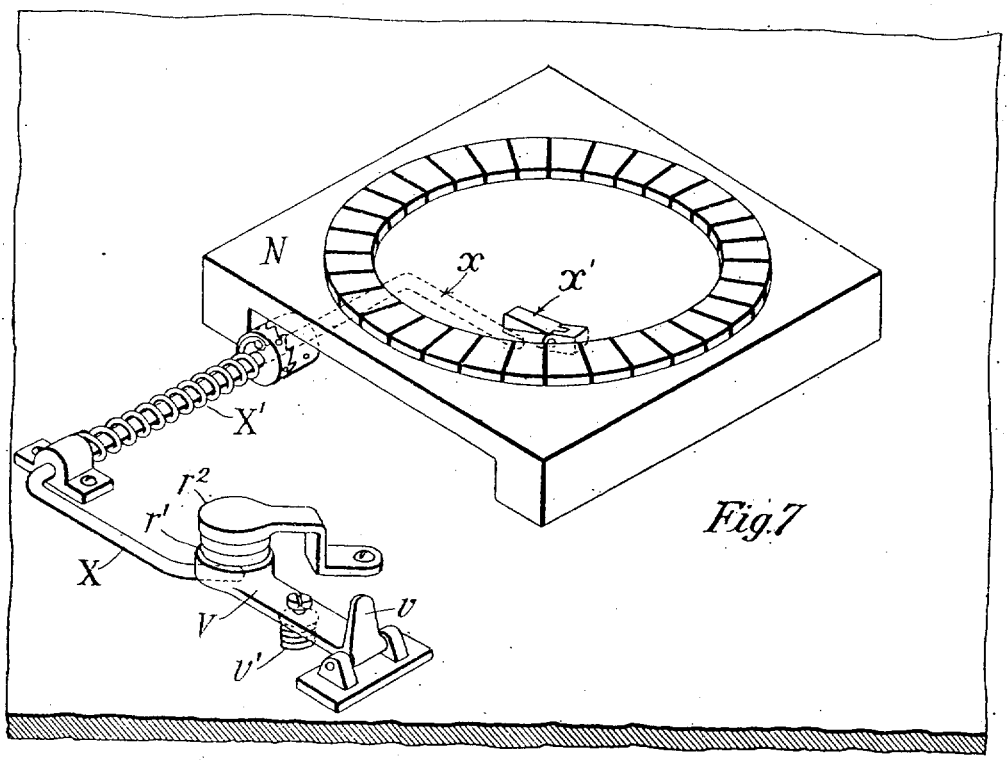
Figure 8:
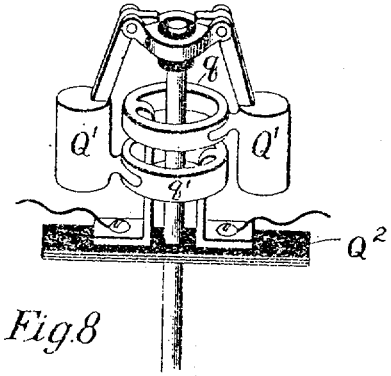
Figure 9:
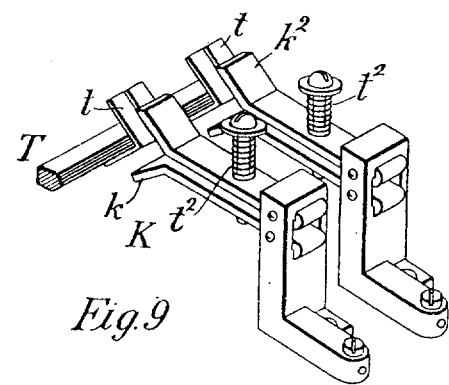

Figure 1 is partly an elevation and partly a diagrammatic view of a railway vehicle lighted by my system; Fig. 2 is an elevation of the regulating device; Fig. 3 is a plan view of the rheostat contact; Fig. 4 is an elevation of the rheostat contact; Fig. 5 is a section of the potential magnet; Fig. 6 is a plan of wiring of the regulating device; Fig. 7 is a perspective detail view of the rheostat and its means of connection with the potential magnet; Fig. 8 is a detail view of the governor; Fig. 9 is a detail view of the switch connection with a part broken away.

I mount on a car A, a shunt-wound dynamo B, by means of a swinging support C, secured to the sill $a$ of the car in such a manner that the dynamo may be free to move slightly to adjust itself to the movement of the truck in which the wheel W and the pulley $w$ are mounted. About the pulley $w$ I arrange a belt $b$ which operates the dynamo. For the purpose of holding the dynamo B against the tension of the belt $b$, I arrange a rod D, passing through the bracket $d$, and provided with the spring $d^1$ which spring tends to force the rod D forward against the strain of the belt $b$. It is advisable to mount the dynamo so that it is capable of motion, for the reason that the car truck, to the axle of which the belt operating the dynamo is connected, is constantly moving up and down and about the curves, which tends to exert a strain on the belt and renders it necessary to provide for the movement of the dynamo or allow for the slipping of the belt, which slipping I desire to avoid. By mounting the dynamo on the sill of the car I provide for accomplishing this result.

I arrange a storage battery E, preferably beneath the car and connect the dynamo therewith by the wire F, which provides for supplying the battery. H is the negative wire of the storage battery.

The regulating device I preferably inclose within the box J, and mount the same in the car. The regulating mechanism, consisting preferably of a train switch K, potential magnet L, current-director M, rheostat plate N, resistance coils O, motor P for operating the rheostat, and governor Q for the motor, is preferably connected up in the following manner, see Fig. 6.

The wire F, which is connected with the storage battery E is connected within the box J Fig. 1 with the wire $f$, which is connected with the fields $f^1$ of the motor P, said fields also being connected by the wire $f''$ with one of the branches R of the current-director M, another of the branches $R^1$ being connected by means of the wire $r$ to the negative wire $H^1$, which is connected with the wire H, the negative wire of the storage battery.

The motor P is thus in circuit with the storage battery and the direction of the motor is determined by the current-director in said circuit.

The current director M is arranged with the branches R and R$^1$, provided with contacts at each end, and the intervening branch R$^2$ is suitably secured at its center to the arm $l$ secured to the plunger $l^1$ of the potential magnet L. It is apparent that when contacts are made with the central branch R$^2$ touching one end of the branch R$^1$ and the opposite end of the branch R, a current will be sent through the fields of the motor which will operate the same in the opposite direction from that in which it will be operated when the opposite ends of the branch R$^2$ are in contact with the opposite ends of the branches R and R$^1$.

To the armature $p$ of the motor P, I connect at one end a worm $p^1$, Fig. 2, adapted to engage with the rheostat gear wheel $n$, and thus to revolve the wheel, carrying the contact arm N$^1$, Figs. 2 and 6, on said plate N. On the other end of the armature $p$, I arrange a governor, shown in detail in Fig. 8, provided with one or more weighted centrifugal arms Q$^1$, each adapted to rub upon the circular centrifugal contact disks $q$, $q^1$, mounted rigidly upon the insulating plate Q$^2$. One of the said disks $q^1$ I connect by wire $q^2$, Fig. 6, to the branch R$^2$, on one side of its pivotal support, while the other disk $q$, I connect, via the motor armature, by wire $q^3$ to the branch R$^2$, on the opposite side of its pivotal support. The wire $q^3$ is connected to the brushes $q^4$, $q^5$ of the motor P. As thus arranged, when the armature revolves too rapidly, the weighted arms Q$^1$ are lifted from the disks $q$, $q^1$, and the current is cut off from the armature. This tends to steady the motor and prevent racing, which is liable to occur in apparatus adjusted as this is for regulating the flow of electricity through the circuit.

The train switch is made up of the magnets K$^1$, K$^1$, Fig. 2, there being four magnet-coils arranged, two upon the bar S, and two upon the corresponding bar S$^2$. The bars S and S$^2$, the former being stationary, the latter movable, tend to attract or repel each other, depending upon the current passing through the magnets, the two bars being pivoted together at their centers. Upon each of the magnets I arrange two coils, one a series coil from the dynamo, represented in the diagrammatic view in Figs. 1 and 6 by the heavy line, the other coil being of fine wire, which is in shunt with the storage battery and dynamo. The series coil is of heavy wire, the shunt coil is of fine wire. The contact piece T is attached to one arm S$^2$ of the switch K. When the current through the magnets magnetizes the arms S and S$^2$ so that they attract each other, the switch arm T is brought in contact with the contacts K and K$^2$. I also connect the large wire of one of the magnets K$^1$ with the large wire $l^2$ in the potential magnet L, by means of the wire 14. The contact plate $k$ is connected with the large wire $k^1$ in one of the magnets K$^1$, which passes through both of the magnets K$^1$, K$^1$, and, by the wire $l^2$ in the potential magnet L, is connected with the wire H and passes to the storage battery. The magnets K$^1$ also have a fine wire coil K$^2$, which is wound about the heavy coil of wire K$^1$ and which is connected with the contact $k^2$ and with the wire $f$, Fig. 6, leading to the positive wire F of the storage battery. As thus arranged, when the current is passing through the magnets K$^1$, the switch will be closed unless a sufficiently low voltage is generated by the dynamo to cause the influence of the series wire K$^1$, in the circuit from the battery, to overcome the influence of the small wire coil K$^2$ upon the arms S and S$^2$, and thereby demagnetize them. When that occurs, the spring $s$ will draw the magnets apart and break contact of the switch. It will be remembered that the small-wire coil is in shunt and so energized by the dynamo, while the series wire K$^1$ receives the dynamo current. Hence the slowing up of the dynamo will not only tend to weaken coils K$^1$ and K$^2$, but at a certain point, the battery current will tend to flow back through K$^1$ and so, by its reverse direction of flow will overcome and neutralize the influence of K$^2$. The train-switch K thus serves as an automatic connection switch between the dynamo and battery and may be set to act at any desired potential of the dynamo.

The potential magnet L, which I will now describe, is made up of two coils, one of which is a series coil of a few turns of heavy wire $l^2$, the other a shunt coil of a large number of turns of fine wire $l^3$, as shown in Fig. 5, and also shown diagrammatically in Figs. 1 and 6, said coils being preferably wound on a brass spool. The fine coil of wire $l^3$ is connected with the wire $f$, the positive wire of the storage battery and dynamo, and also with the wire $u$ extending from the rheostat arm to the negative wire of the dynamo, being thus in permanent shunt between the positive and negative brushes of the dynamo on the dynamo side of the main switch K. The heavy wire $l^2$ is connected with the wire K$^1$, and also with the wire H$^1$, connecting with the negative wire of the storage battery. The potential magnet thus has a shunt circuit of fine wire between the poles of the dynamo, and a series circuit of heavy wire in series with the storage battery. The plunger $l^1$ of the potential magnet is connected with the current-director M, as already described. To the arm $l$ (connecting the plunger $l^1$ with the branch R$^2$ of the current-director) I arrange a spring 10, anchored at 11, the tendency of the spring being to withdraw the plunger from the magnet and bring the same in contact with the catch $v$ (see Fig. 7) on the contact lever V, which lever V is provided with a contact $r^1$ contacting with the contact $r^2$ both contacts being in the circuit leading to the branch $R^1$ of the current director. I arrange a spring $v^1$ adapted to hold the contact $r^1$ in connection with the contact $r^2$. I also arrange a bent lever X, one end of which presses beneath the lever V, and forces the contact $r^1$ into engagement with the contact $r^2$ and holds them securely together. The lever X is provided with a tension-spring $X^r$ suitably mounted, the tendency of which spring is to hold the lever X in contact with the lever V. The lever X is also provided with a portion $x$ which passes beneath the rheostat-plate N, its end resting beneath the hinged lever $x^1$, in contact with which the lugs $x^2$ (see Figs. 3 and 4) on the rheostat wheel N engage until the wheel $n$ has made a partial revolution. By this device, the wheel $n$, when at rest in its off or home position, releases the contacts $r^1$ and $r^2$ (by lug $x^2$ striking lever $x^1$) which are then under control of the plunger and will be opened, by the plunger coming in contact with catch $v$ whenever the potential magnet is deënergized—as by the stopping of the train—and the spring 10 withdraws the plunger against the catch. Since the contacts are in the circuit leading from the battery to the motor, that circuit is thereby broken—thus preventing leakage of battery current through the motor—during the time that the train and dynamo are standing still, or running so slowly that the potential magnet is not strong enough to draw in its plunger against the power of spring 10. As thus arranged; when the potential magnet L receives a current of more than the required amount for maintaining the voltage of the circuit at the required point, the plunger $l^1$ is drawn within it and contact is made by the current director, setting in motion the motor, which revolves the rheostat wheel and throws resistance into the field-magnet circuit. Conversely when the potential magnet L receives a current of less than the required amount for maintaining the voltage of the circuit at the required point, the plunger $l^1$ is withdrawn, by its spring 10, and contact is made by the current-director on the opposite contacts, setting in motion the motor in the opposite direction which revolves the rheostat wheel and throws resistance out of the field-magnet circuit, this action being continued, as the speed of train and dynamo decrease, until the reserve power of the field magnet is exhausted, when, the speed and voltage of the dynamo still continuing to fall, the potential magnet receives still less current in its shunt coil $l^3$ and the back current from the battery tends to flow in a reverse direction through its series coil $l^2$. When this back current is so great and so much resistance has been thrown out, that the lug $x^2$ on the wheel $n$ comes in contact with the hinged lever $x^1$, it presses the bent lever X away from contact with the lever V, and the plunger of the potential magnet becoming demagnetized because of the series coil from the storage battery operating upon the plunger and the shunt coil from the dynamo becoming neutralized, the spring 10 withdraws the lever $l$ attached to the plunger until the lever strikes the catch $v$, thereby breaking contact between $r^1$ and $r^2$ and stopping the motor, and, at the same time, the train switch K, which is being acted upon in like manner by its shunt and series coils, breaks its connection. Immediately upon the resumption of dynamo speed and voltage the switch K makes contact and closes the circuit while the potential magnet, becoming energized by its shunt coil $l^3$—and if the battery requires, and so takes, additional current by its series coil $L^2$ also—draws in the plunger. Contact is also again made at $r^1 r^2$ in the motor circuit and the motor acts, under control of the potential magnet, to throw in or out of circuit the field magnet resistance just as before.

It will be noticed that the spring $v^1$ will hold the contact $r^1$ on the lever V in engagement with the contact $r^2$ after the bent lever X is removed. The bent lever X, when it engages with the lever V, holding contacts $r^1$ and $r^2$ securely together.

In Fig. 6 I show the wiring connecting portions of the resistance O to the contact plates $n^1$, on the rheostat plate N, the rheostat arm $N^1$ being connected by the wire Z to the wire $k^3$ leading to the negative wire of the dynamo. The wire $Z^1$ connects the contact plate $n^4$, with the field of the dynamo. The other contact plates $n^1$ on the rheostat plate N, connect with the different portions of the resistance coil O in such a manner, that, as the arm passes from the contact $n^4$, where i is at zero, additional resistance is thrown in, increasing as the arm passes from $n^4$ around the plate N.

For the purpose of reducing the magnetic resistance of the potential magnet L, so that it shall magnetize and demagnetize the plunger quickly and positively, I arrange an iron envelop 16, Fig. 5, which furnishes a good path for the lines of force to pass from one end of the plunger around the winding to the opposite end, so that the magnetic resistance is very much reduced, said envelop is provided with openings at the end of the magnet larger than the opening through which the plunger $l^1$ passes, making a large air gap. In this way, the iron envelop does not come in contact with the plunger, nor so near the same as to act upon the plunger to prevent its free movement within the armature. Should the iron envelop come so near the plunger as to attract it, it would tend to hold the same and prevent its ready movement under the influence of the spring 10 or the coils within the magnets, as the plunger would be drawn against one side of the opening and friction would ensue. This arrangement of a potential magnet consisting of a shunt coil and a series coil with the iron envelop arranged as described, is an important part of my invention. The effects of the two coils on the plunger are combined when the flow takes place from the dynamo to the battery and opposed when the current flows from the storage battery to the dynamo—a feature which makes the potential magnet stronger as the flow of current from the dynamo to the battery becomes greater, in which case it requires a lower potential or voltage on the shunt coil to draw in the plunger a given distance against the force of spring 10. Such lower voltage or potential will then be maintained (the effect, however, being slight because of the very few turns—5 turns are shown in Fig. 5—of the series coil) in accordance with the magnitude of the current flowing to the battery, which lowering of the voltage will, in turn, act to restrict or limit the amount of current which the battery can receive. The two coils, acting as they do when opposed to demagnetize the plunger—the current through one of the coils counteracting the current through the other and reducing the effect on the plunger to zero—with the iron envelop tending to make the action of the coil more direct form an exceedingly sensitive and positive device for operating a current director.

For the purpose of making a uniformly positive contact in the train switch, I preferably arrange upon the contact piece T, see Fig. 9, the contact plates $t$, $t$, wedge shaped and made of spring metal and the contact pieces $k$ and $k^2$ are preferably arranged with two pieces, with flaring ends, adapted to receive the wedge-shaped pieces $t$, $t$. The contact plates $k$, $k^2$ are secured at their ends and adjusted by means of the set-screws $t^2$, provided with a spring upon each of the screws, so as to allow for a "giving" at the contact ends of the plates in such a manner that the switch will, in closing, make a positive contact with the plates on both sides of the wedge-shaped portions $t$, $t$, even if the contact piece T should not be exactly true.

The operation of my invention is apparent. When the current generated by the dynamo is less than sufficient, in voltage, to charge the storage battery, the tendency will be for the storage battery to work back, and the current will then flow from the storage battery to the dynamo, reversing the flow through the series coil on the train switch and on the potential magnet, breaking contact between the dynamo and the storage battery, as above described. Of course the potential magnet will prevent such a deficiency in dynamo voltage so long as the dynamo speed is above the critical limit, by causing the motor to remove resistance from the dynamo field magnet circuit and so strengthen the dynamo as its speed decreases until the limit of speed decrease i reached. Beyond that point the dynamo voltage will begin to drop until it is less than that of the storage battery and the train switch acts to disconnect the two. The charging current flowing to the battery passes, it will be remembered, through the series coil $l^2$ on the regulator magnet in a direction to supplement the action of the shunt coil $l^3$. The series coil contains but a few turns, in practice less than ten. It should also be remembered that there is one definite position of the core of the regulator magnet at which the detector will be open-circuited so as to deliver no current to the motor. This may be termed the satisfied condition, since at that time the magnet is not calling upon the motor to either increase or decrease the resistance in the field magnet circuit of the dynamo. Obviously this satisfied condition of the regulator magnet is produced by the combined effect of the series coil plus the shunt coil. If no current is flowing in the series coil then the shunt coil alone will be required to bring the magnet core to this satisfied position but this will require a larger current in the shunt coil and consequently a higher voltage applied to its terminals. In other words the shunt coil will then maintain a higher dynamo voltage, since such higher voltage will be required to bring the magnet core to the satisfied condition and any tendency of the voltage to drop will be neutralized by the retraction of the magnet core, the closing of the motor circuit by the director and the operation of the motor to remove resistance from the dynamo circuit and so cause it to increase in power sufficient to raise the voltage to the aforesaid point at which the magnet will be satisfied. If, on the other hand, there is current flowing in the series coil of the magnet it will tend to assist the action of the shunt coil so that the latter will require a smaller current and lower voltage to bring the magnet core to the satisfied position. In other words, the magnet will be satisfied by and maintain a lesser dynamo voltage to the extent that its power is supplemented by the current in the series coil. Consequently when the battery is practically exhausted and hence has a low counter electromotive force a large current will tend to flow into it and in so doing will pass through the aforesaid series coil on the regulator magnet. This will cause the magnet to maintain a lower voltage for the reason just explained.

Then as the battery becomes charged and its counter electromotive force increases a lesser degree of current will tend to flow into it through the series coil and the dynamo voltage will be increased in the manner already explained. This action will continue as the charging proceeds, there being a gradual decrease in the amount of current flowing to the battery and a gradual rise in the voltage of both battery and dynamo until the two voltages practically meet and little or no current flows into the battery. For example, the battery may at beginning take a current of 25 amperes at 60 volts. As the charging progresses this current will be gradually reduced and at the same time the voltage will gradually rise until at say 70 volts the counter electromotive force of the battery equals the direct electromotive force of the dynamo and no current flows into the battery. At the same time no current will flow through the series coil $l^2$ and the shunt coil $l^3$ will act alone to maintain the dynamo voltage at 70 volts.

After the storage battery has been used and requires to draw upon the dynamo for further supply, the normal flow of current through the series coil to the battery will be resumed and, as already described, such current will be limited in amount according to the condition of the storage battery which is thereby protected from injury by an excessive current flowing into it when it is exhausted. The motor controlling the rheostat is operated by current from the storage battery, instead of the dynamo (being connected to the circuit on the battery side of disconnecting switch K). This enables me to provide a positive and reliable regulation. The motor must be made to move slowly (by the governor above described) in order to prevent racing and if it were operated by current from the dynamo and the dynamo should suddenly stop (as by the breaking of a belt) or its fuse blow out, at a time when all or nearly all of the resistance of the rheostat were in, sufficient time would not be given to the motor, to return the rheostat to its zero position, before the switch K would open, or the voltage of the dynamo would drop to such a point that the motor would not operate, but with my arrangement, when the dynamo stops, the current from the storage battery will continue to operate the motor to throw out all of the resistance, regardless of the action of the decreasing dynamo current.

The current from a battery charged in the manner I have described may be utilized in any desired way. For example in my application No. 725,433, of which the present application is a division, the storage battery is automatically drawn upon to supply incandescent lamps which are normally supplied by the same dynamo which charges the battery, but which require the battery supply during the periods when the dynamo is at rest or running too slowly. As another example, the battery, when charged, may be manually disconnected from the dynamo and connected to the lamps as in the plan proposed in the patent of Moskowitz, No. 525,992, of September 11, 1894, another battery being at the same time disconnected from the lamps and connected to the dynamo for recharging; or a single battery may be charged during the day and then disconnected and used at night to operate the lamps. In whatever way the current from the charged battery is utilized, the charging of it from an intermittent and variable-speed dynamo will be facilitated and made safe by my arrangement, while, after the charging is completed, the battery may remain connected to the charging circuit for an indefinite period, since its potential is about equal and opposite the standard and maintained dynamo potential and little or no current will flow into the battery and little or no energy expended by the dynamo. Preferably the standard dynamo potential will be slightly higher then the counter potential of the battery so that a minute current, sufficient to hold the charge, will flow after the charging is finished. Thus, by employing a constant potential dynamo, the rise of the counter potential of the battery, as it becomes charged up to the level of the dynamo potential serves to gradually taper off the charging current as the potentials become equalized. This avoids the need for special appliances to shut off the current from the battery when it is completely charged and gasing begins, such as are required when batteries are charged by a constant current with the varying potential involved therein, and a continuation of the normal amount of current-flow into the battery, after the charge is completed would be a mere waste of energy consumed in the decomposition of the battery liquid into its component gases.

What I claim as new and desire to secure by Letters Patent is:

1. The combination with a variable-speed dynamo, of a storage battery to be charged thereby and means dependent on the condition of the storage battery for limiting the current flowing into the battery during the charging period.

2. The combination with a variable-speed dynamo, of a storage battery to be charged thereby, a constant-potential regulator for the dynamo, and means including a series coil between the dynamo and battery for limiting the current flowing to the battery during the charging period.

3. The combination with a variable speed dynamo, of a storage battery to be charged thereby, a constant potential regulator for the dynamo and means dependent on the condition of the storage battery and responding to the current flowing into the battery during the charging period, for limiting the potential applied to the battery.

4. The combination with a constant-potential dynamo driven at a variable speed of a storage battery to be charged thereby, having its counter potential dependent on the condition of its charge, an automatic connection-switch between dynamo and battery set to act at a determined dynamo potential and means for automatically limiting the amount of charging current which tends to flow from the dynamo to the battery by reason of the difference between the maintained potential and the variable counter potential of the battery during the charging period.

5. The combination with a constant potential dynamo driven at variable speed, of a storage battery to be charged thereby and having its counter potential dependent on the condition of its charge, an automatic connection-switch between the dynamo and battery set to act at a determined dynamo potential, and means for adjusting in accordance with the condition of the battery the standards at which the dynamo potential is maintained during the charging period.

6. The combination with a dynamo driven at a variable speed, of a storage battery to be charged thereby and having its counter potential dependent on the condition of its charge, an automatic connection-switch set to act at a determined dynamo potential, a regulator for the dynamo controlled by the generated potential, as distinguished from its generated current, and means for automatically modifying the regulator according to the condition of the storage-battery during the charging period.

7. The combination with a dynamo driven at a variable speed, of a storage battery receiving a variable charging current therefrom, an automatic connection-switch between the dynamo and battery set to act at a determined dynamo potential, and means responding to the battery current for limiting the charging current according to the condition of the storage battery.

8. The combination with a variable speed dynamo, of a storage battery to be charged thereby, a connection switch set to act at a determined dynamo potential, a regulator for the dynamo and a potential magnet controlling said regulator and provided with a fine-wire coil shunting the dynamo and a modifying coil of coarse wire in series with the battery so as to receive the charging current flowing to the battery from the dynamo.

9. A potential-regulating magnet for a battery-charging dynamo provided with a series-wound coil and a shunt-wound coil, combined with regulating devices controlled thereby said series coil connected between the storage battery and the dynamo, and said shunt coil connected between the poles of the dynamo, so arranged as to be actuated by both difference of potential and flow between the dynamo and storage battery.

10. A potential-regulating magnet for a battery-charging dynamo comprising a shunt coil connected between the poles of the dynamo and a series coil connected between the dynamo and storage battery and so wound as to coöperate with the shunt coil when the current therein flows from the dynamo to the battery combined with regulating devices controlled thereby.

11. The combination with a constant potential dynamo driven at variable speeds, of a battery to be charged thereby, an automatic connection switch between the dynamo and battery, and means for modifying the potential applied by the dynamo to the battery during the charging period to a point lower than that required to overcome the maximum counter potential of the battery and reducing such modification as the charging proceeds.

12. The combination with a variable-speed dynamo, of a storage battery to be charged thereby, an automatic connection switch between the battery and dynamo, a regulator for the dynamo controlled by the potential as distinguished from the current generated by the dynamo, and means for automatically reducing the potential at the beginning of a charge and eliminating such reduction as the charging proceeds.

In witness whereof I have hereunto set my hand, before two subscribing witnesses, this 12th of November, 1904.

JAMES F. McELROY.

Witnesses:
BEULAH CARLE,
WILLIAM A. MORRILL, Jr.